United States Patent Office 3,062,800
Patented Nov. 6, 1962

3,062,800
HYDROGENATED CYCLOPENTADIENE POLYMERS
Israel J. Dissen, Chicago, Ill., assignor to Velsicol Chemical Corporation, Chicago, Ill., a corporation of Illinois
No Drawing. Filed Jan. 14, 1960, Ser. No. 2,352
7 Claims. (Cl. 260—93.1)

This invention relates to hydrogenated cyclopentadiene polymer products and, more particularly, to the process of preparing cyclopentadiene polymer products by the catalytic hydrogenation of polymerized cyclopentadiene in the presence of palladium metal catalyst, and the products thereof.

Cyclopentadiene can be polymerized into several distinct polymers each having a different linkage system. The polymer herein understood to be cyclopentadiene polymer is that polymer catalytically polymerized from cyclopentadiene, having mainly 1,4 linkages in the following manner:

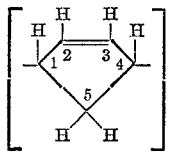

and soluble in the common aromatic solvents, such as benzene, toluene, and xylene.

One object of this invention is to provide a polymer product suitable for use as a metal container lining.

Another object of this invention is to provide a metal container lining which upon baking remains flexible and adherent for extended aging periods.

Another object of this invention is to provide a sanitary can liner, inert to most food products.

Another object of this invention is to provide a sanitary can liner resistant to the high temperatures involved in food sterilization.

Still another object of the present invention is to provide a metal container liner which will not break, chip, or crack during container fabrication operations.

These and other objects of the present invention will be apparent from the following description.

The compositions of the present invention can be readily produced by reacting catalytically polymerized cyclopentadiene polymer with hydrogen gas in contact with palladium catalyst. The polymer is stirred and heated until at least 60% of the double bonds initially present have been hydrogenated. It is a preferred embodiment of this invention to hydrogenate the polymer to at least 80%, thus resulting in a coating which is generally clear as compared to coatings of polymer hydrogenated to from about 60% to about 80%, which are generally hazy.

The use of palladium catalyst enables cyclopentadiene polymer to be hydrogenated to products of this invention. The products thus obtained are unexpected, since the use of other metals as hydrogenation catalysts, even closely related, such as platinum and nickel, results in entirely different polymer, having different and inferior properties and a different infrared spectrum.

More specifically, in preparing the present products, the cyclopentadiene polymer, free from polymerization catalyst, is first dissolved in a solvent or a solvent mixture preferably selected from the group consisting of aromatics, cycloalkanes, and halogenated alkanes. The aromatic solvents are preferred, especially xylene, rather than the chlorinated alkanes which can cause discoloration and gelation, and the cyclic alkanes in which cyclophentadiene polymer is soluble to a lesser extent. The amount of solvent used is not critical. A polymer content of 20% was found to be convenient for experimental handling, and the preferred concentration will depend upon the hydrogenation apparatus.

A solvent solution of cyclopentadiene polymer is placed in a suitable mixing apparatus, and mixed with a catalytic amount, preferably between about 0.01 and about 1% palladium metal based on the weight of polymer. The palladium can be supported on any of the common catalyst supports, especially on carbon (charcoal), barium sulfate, and alumina carrier. For example, a 10% palladium on carbon catalyst was found to be satisfactory.

Hydrogen gas is charged to the mixture of polymer solution and catalyst and thereafter a pressure above atmospheric and preferably above 100 pounds per square inch is maintained. Although there is no theoretical limit to the pressure that can be used, for commercial purposes, pressures between about 100 and 150 pounds per square inch are adequate. At hydrogenation temperatures, such as those preferred in this invention, the rate and degree of hydrogenation at 800–1400 pounds per square inch were found to be similar to those at 100–150 pounds per square inch. At pressures lower than 100 pounds per square inch, for example, 30–60 pounds per square inch, the hydrogenation rate is considerably slower. Accordingly, operating pressures higher than about 150 pounds per square inch are not of practical value.

The reaction temperature during hydrogenation is not critical, elevated temperatures above 25° C. being operable and temperatures above 60° C. being preferred to provide a rapid, easily controllable rate of hydrogenation. The hydrogenation rate is a function of temperature and therefore the temperature can be slowly increased during hydrogenation to provide a steady reaction rate with good control, or a higher temperature can be selected to decrease the reaction time. As a practical matter, temperatures above about room temperature (25° C.) have been found to be adequate and convenient, increased reaction rates being obtained at temperatures above about 60° C. If an aromatic solvent is used, temperatures lower than 120° C. are preferable, as the aromatic solvents tend to hydrogenate at a rate which is also a function of temperature.

It is a preferred embodiment of this invention to perform the heretofore stated hydrogenation in the presence of a hydrogenation promoter. Such promoters can be organic polar substances, examples of which are organic acids and alcohols which are at least partially soluble in the hydrogenation solution. The incorporation of one or more of these promoters in concentrations of from about 1 to about 10% of the polymer has the effect of increasing the rate of hydrogenation of the cyclopentadiene polymer in the presence of palladium in catalytic amounts. Acetic acid and n-butanol have been found to be especially useful as promoters.

The length of time the hydrogenation is permitted to proceed depends upon the rate and degree of hydrogenation. The rate of hydrogenation is a function of temperature, pressure, and concentration of catalyst and promoter. The degree of hydrogenation determines the properties of the polymer product. The following table illustrates the degree of hydrogenation as a function of the amount of catalyst at a relatively constant temperature of 65–75° C., and at a relatively constant reaction time of three hours. The table also compares the degree of hydrogenation with the appearance and fabrication properties of the baked film product.

TABLE I.—DEGREE OF HYDROGENATION AS A FUNCTION OF AMOUNT OF CATALYST

| Percent Catalyst Based on Solids | Percent Double Bonds Hydrogenated | Appearance of Baked Film | Presence of Residual Unsaturation After Baking |
|---|---|---|---|
| 6.7 | 87 | Clear | No. |
| 1.9 | 71 | Hazy | No. |
| 1.2 | 65 | do | No. |
| 0.6 | 30 | Slightly hazy | Yes. |

The samples of polymer used in the study illustrated in Table I were hydrogenated for 3 hours; by extending the reaction time to 4 hours or more, 80% hydrogenation with 1¼ to 1½ of 10% palladium on carbon catalyst can be readily obtained. With extended reaction times and 5 to 10% of the 10% palladium on carbon catalyst, degrees of hydrogenation as high as 91 to 93% are obtained. It was generally found that cyclopentadiene polymers which are at least 80% hydrogenated form clear films on baking, while those hydrogenated to only 65 to 75% produce a hazy film which still has properties suitable for container linings. At lower levels of hydrogenation, residual unsaturation was found even after baking by infrared analysis.

After hydrogenation is completed the catalyst is removed from the polymer solution. The method of removal varies with the form of catalyst support used. For example, palladium on carbon can be removed by filtering through a bed of carbon, a bed of catalyst, or a sintered glass funnel. The palladium on carbon can also be removed by adsorption in a column containing methyl cellulose and by centrifugation. Palladium on barium sulfate, which gives a slower hydrogenation rate than the metal on carbon, can be removed by any of the methods stated above. Palladium on alumina can easily be removed by settling and decantation of the polymer solution.

The following examples are presented as methods of preparing, applying, and testing the polymer products of this invention, and are presented by way of illustration and are not intended to limit the scope of this invention.

*Example 1*

PREPARATION OF HYDROGENATED CYCLOPENTADIENE POLYMER

A solution (2.2 liters) of 12.6% cyclopentadiene polymer (242 g.) in xylene was charged, along with 10% palladium on carbon catalyst (3.1 g., 1.28% based on weight of polymer) into a 4.4 liter rocking pressure bomb. The bomb was evacuated to remove air, and was pressured with hydrogen gas to a pressure of 150 pounds per square inch. The bomb was heated to 75° C. and maintained at a temperature of approximately 70° C. for 8 hours, during which time the bomb was rocked continuously. Six times during the reaction, the bomb was recharged with hydrogen to 150 pounds per square inch after the pressure had dropped to 50 pounds per square inch. The total pressure drop, uncorrected for temperature difference, during the reaction was 516 pounds per square inch.

The reaction mixture was then removed from the bomb and poured through a bed of filter-aid to remove the palladium on carbon catalyst. The catalyst-free hydrogenated polymer solution was then stripped at 140° C. and atmospheric pressure to obtain a coating solution containing 38.7% polymer.

The viscosity of a 20% solids sample of this solution was found to be 26.9 centipoises at 25° C. The solution was coated on a tin panel and fabricated by the method of Example 7. The results of the coating and fabrication were excellent.

*Example 2*

PREPARATION OF HYDROGENATED CYCLOPENTADIENE POLYMER AT HIGHER PRESSURE

A solution (125 ml.) of 15% cyclopentadiene polymer in xylene was charged, along with 10% palladium on carbon catalyst (1.1 g., 6.7% based on weight of polymer), into a 250 ml. stainless steel bomb in a Magne Dash apparatus. The bomb was evacuated to remove air, charged to 1035 pounds per square inch with hydrogen gas, and dashing was begun. Due to initial saturation of solution, the pressure dropped to 970 pounds per square inch, at which time the temperature was raised to and maintained at approximately 65° C. for 5¾ hours.

The Magne Dash apparatus is sold by Autoclave Engineers, Incorporated, Erie, Pennsylvania, U.S.A., under license from Standard Oil Company of Indiana, and is covered by United States Patents 2,631,091 and 2,661,938. The term "dashing" is the vertical stirring motion of the apparatus.

At the end of the final 5¾ hours, the dashing was stopped and the temperature was allowed to fall to room temperature. Approximately 70% of the theoretical amount of hydrogen had been taken up by the reaction mixture. The product solution was centrifuged at 2000 revolutions per minute and the gray supernatant liquid was passed through methyl cellulose (5 g.) to yield a clear, colorless solution. Solvent was stripped from the solution at room temperature in vacuo. The polymer content of the solution after stripping was found to be 28%. The product was diluted back to 20% polymer by the addition of xylene. The viscosity of the 20% solution at 25° C. was 65.8 centipoises.

Samples of this solution were coated onto tin panels, baked, and fabricated by the method of Example 7. The results of fabrication were excellent.

Samples of the stripped 28% solution were diluted with mineral spirits and fabricated by the method of Example 7. Mineral spirits and like solvents have good compatibility in hydrogenated polymer solution and the fabricated panels indicated the coatings were excellent and comparable with those of the polymer in xylene solvent.

*Example 3*

PREPARATION OF HYDROGENATED CYCLOPENTADIENE POLYMER

A solution (532 g.) of cyclopentadiene polymer (28%) in xylene was poured into a ½-gallon glass jug. n-Hexane was added until the polymer discontinued precipitation from solution. The hazy supernatant liquid was decanted and cyclohexane was added to the precipitate to give a total of 805.8 g. of solution, having a solids content of 17%.

A portion of the above solution was further diluted with cyclohexane until a solution containing 13% solids was obtained. This latter solution (125 ml.) was charged into the 250 ml. Magne Dash apparatus described in Example 2, along with 10% palladium on carbon catalyst (0.9 g., 7.15% based on polymer). The bomb was evacuated to remove air and was charged to 1140 pounds per square inch with hydrogen gas. The temperature was then raised to and maintained at about 65° C. and dashing was begun and continued for about 8 hours. The total pressure drop during reaction was 535 pounds per square inch. This represented a hydrogen take-up of 70% of the theoretical hydrogen take-up.

The solution was cooled. It was desired to coat the polymer from a xylene solution; therefore, xylene was added in an amount sufficient to form a 20% polymer solution in xylene, as if the cyclohexane was not present. Then the cyclohexane was stripped off selectively in vacuo.

This stripping was performed easily, since cyclohexane is lower boiling than xylene. However, the polymer in cyclohexane solution could have been used as the coating material with similar satisfactory results.

The polymer in xylene solution was coated onto panels, baked, and fabricated by the method of Example 7. The finished can lids indicated the coatings were excellent.

Example 4
PREPARATION OF HYDROGENATED CYCLOPENTADIENE POLYMER

A solution (148.5 g.) of cyclopentadiene polymer (30 g., 20.0% polymer) in xylene was placed in a pressure bottle along with 10% palladium on carbon catalyst (2 g., 6.7% based on weight of polymer), and concentrated acetic acid (1.5 g., 5% based on weight of polymer). The bottle was stoppered, placed in a Parr mechanical rocking apparatus, and evacuated of air. The bottle was then pressured to 60.5 pounds per square inch with hydrogen gas. A heat lamp was so positioned that it would heat the contents of the bottle. The rocking was begun and continued for 4.7 hours, during which time the heat lamp was continuously used. At the end of this time, an amount of hydrogen had been taken up in solution, which was equal to 91% of the theoretical amount of hydrogen.

The product solution was cooled and centrifuged to remove the catalyst. The acetic acid promoter was removed by pouring the product solution through one or more beds of sodium carbonate or similar alkali or alkaline earth salt of a weak acid.

The solution is then poured onto panels, baked, and fabricated as in Example 7. The results of such fabrication are excellent and comparable to those in Examples 1 and 2.

Example 5
PREPARATION OF HYDROGENATED CYCLOPENTADIENE POLYMER

A solution (145.8 g.) of cyclopentadiene polymer (30 g., 20.2% polymer) in xylene was placed in a pressure bottle, as in Example 4, along with 10% palladium on carbon catalyst (2 g., 6.7% based on weight of polymer), and n-butanol (1.5 g., 5% based on weight of polymer). The bottle was placed in a Parr apparatus as in the previous example, evacuated to remove air, and pressured to 60.3 pounds per square inch with hydrogen gas. The heat lamp was turned on and heating and rocking were maintained for 3 hours. At the end of this time 25.2 pounds per square inch had been taken up by the solution, which is equal to 71.3% of theoretical.

The product solution is next cooled and centrifuged to remove the catalyst. The n-butanol promoter is removed by stripping from the solution in vacuo at room temperature or at higher temperatures at atmospheric pressure.

The solution is poured onto panels, baked, and fabricated as in Example 7. The results of such fabrication are excellent and comparable to those in Examples 1, 2, and 4.

Table II is illustrative of the effectiveness of the hydrogenation promoters used in Examples 4 and 5 and compares the degree of hydrogenation for each method after approximately one hour.

TABLE II.—EFFECTIVENESS OF HYDROGENATION PROMOTERS

| Example | Promoter | Time in Minutes | Degree of Hydrogenation Percent of Theoretical Hydrogen Uptake |
|---|---|---|---|
| Control | None | 66 | 45.5 |
| Example 5 | 5% n-butanol | 67 | 59.6 |
| Example 4 | 5% Acetic acid | 71 | 77.4 |

Thus, it is noted that while the hydrogenation proceeds satisfactorily without a promoter, the use of a polar solvent alcohol, such as n-butanol, increases the rate of hydrogenation, and the use of a polar organic acid, such as acetic acid, greatly increases the rate.

Example 6
METHOD FOR REMOVAL OF CATALYST

The catalyst-rich cyclopentadiene polymer solution was poured through a sintered glass funnel. At first some of the catalyst passed through the filter. As the amount of catalyst retarded by the filter increased, a bed of catalyst was formed and subsequent catalyst was prevented from passing through. Thus the bed was then removed as the recovered catalyst.

Alternatively, a shallow bed of carbon, for example grade WH, was laid down before the filtration was started to eliminate the catalyst bed build-up. This procedure worked equally as well as the catalyst bed filtration.

The catalyst may also be removed in several other ways, including filtration through beds of filter-aid or cellulose adsorbents, and centrifugation.

Example 7
METHOD OF COATING, BAKING, AND FABRICATING POLYMERS OF THIS INVENTION Hydrogenated cyclopentadiene polymer solutions of this invention were diluted to a concentration of 20% polymer with xylene and coated onto tin panels in a single layer between about 0.2 and about 0.4 mil in thickness. The panels were baked in an oven for 10 minutes at 400° F. and placed in a punch press which supported dies capable of forming a can lid or end. Thus, a can lid or end was formed coated with polymer. The can lid or end was then visually inspected for cracks, crazed sections around the deep bends, and pitholes. The can lid or end was immersed for 2 minutes in a solution comprised of 20% copper sulfate, 10% concentrated hydrochloric acid, and 70% water; washed with water; and inspected for black spots which indicated the solution had reached the tin and copper had plated upon the tin at those places.

The polymer coatings of this invention fabricated readily and were free from cracks.

The polymer products of this invention are useful as container liners and especially sanitary can liners, particularly food pack cans. Food pack cans often have a tin coating to prevent the contents from contacting the can itself. Ofter these tin-lined cans are unsatisfactory since the contents can react with the tin lining, thereby contaminating the contents; the contents can pick up a flavor from the tin liner; or the contents can dissolve the tin liner and attack the steel or iron can. Further, the food pack is often filled, hermetically sealed, and then heated to sterilize the pack. This treatment oftentimes accelerates any reaction with the can or liner that might otherwise remain unnoticeable.

One method of remedying these defects is the insertion of a relatively inert liner. This liner is preferably applied in a liquid form to the iron or tin coated sheets before fabrication. It must withstand stresses and shocks of fabrication, remain inert, and be appealing to the eye after extended periods of time. To determine whether or not coatings are suitable for sanitary liners for food packs, several tests are often used, including the oxygenated spinach tests, the dog food test, and the scorch test.

The oxygenated spinach test simulates the conditions which show the ability of a liner to withstand chemical reactivity of certain food packs, especially those having acidic properties.

The dog food test is especially indicative of reactivity and softening of liners resulting from reaction with packs, since dog food contains a great amount of sulfur. If the pack contacts the tin liner, the sulfide salt of tin forms and contaminates the pack. Dog food also contains fat, which ordinarily softens resin liners. Hence, whenever a polymer coating can be found, which will withstand deterioration by the sulfur in the dog food and softening by the fat in the dog food, that polymer coating is considered to have possible application as a sanitary can liner for food packs, providing the polymer coating can pass the other tests and visual inspection upon fabrication.

The scorch test is a high heat process, in the order of 700° F., which simulates the widely recognized practice of applying a molten solder to the seam of the can body to insure an air-tight seal. The visual inspection of the coating as to discoloration, blistering, pitting, and cracking is indicative of the value of the coating as a food pack liner.

Coatings of unhydrogenated cyclopentadiene polymers bake to flexible, adherent films. Generally they form good sanitary can liners if the coating is fabricated after baking. However, when the coatings are allowed to stand for 2 or 3 weeks in contact with air, and are then fabricated into can parts, severe cracking occurs.

The coatings of this invention do not crack upon fabrication even after several months of standing. Infrared scans of unhydrogenated polymer coatings immediately after baking and after 9 weeks, 17 weeks, 18½ weeks, and 9 months showed continued development and growth of peaks in the hydroxyl and carbonyl regions of the scan. Scans of hydrogenated polymer coatings showed no build-up of hydroxyl and carbonyl groups. Accordingly, it appears that this build-up is detrimental to the desired properties of the polymer. The evidence of the infrared scans and the fabrication properties clearly illustrate the desirability of hydrogenated polymer coatings over unhydrogenated polymer coatings.

The hydrogenated cyclopentadiene polymer coatings of this invention successfully passed the oxygenated spinach, dog food, and scorch tests. The coatings did not show significant softening in either the spinach or dog food tests.

The cyclopentadiene polymers are also useful as extenders for silicone resins, used especially in release coatings for paper coatings. Coatings extended with unhydrogenated polymer were satisfactory immediately after application, but upon standing the coated papers developed brown streaks and poor release properties. Silicone resins extended with hydrogenated polymer of this invention, even up to 50% polymer, do not show streaking and have excellent release properties after a week's aging at 131° F., both in a dry atmosphere and at 90% relative humidity. Furthermore, coated papers which have been in storage for a year are without evidence of streaking.

I claim:

1. A process for the production of hydrogenated cyclopentadiene polymer which comprises hydrogenating a benzene-soluble, catalytic homopolymer of cyclopentadiene having 1,4 linkages with hydrogen in the presence of palladium catalyst at a temperature above about 25° C. until a minimum of 60% of the unsaturation of the initial polycyclopentadiene reactant has been hydrogenated.

2. A process for the production of hydrogenated cyclopentadiene polymer which comprises hydrogenating a benzene-soluble catalytic homopolymer of cyclopentadiene having 1,4 linkages with gaseous hydrogen in the presence of a catalytic amount of palladium at a temperature above about 25° C. until a minimum of 60% of the unsaturation of the initial polycyclopentadiene reactant has been hydrogenated.

3. A process for the production of hydrogenated cyclopentadiene polymer which comprises hydrogenating a benzene-soluble catalytic homopolymer of cyclopentadiene having 1,4 linkages with gaseous hydrogen in the presence of a catalytic amount of palladium and in a relatively inert solvent therefor, at a temperature above about 60° C. and at superatmospheric pressure until a minimum of 60% of the unsaturation of the initial polycyclopentadiene reactant has been hydrogenated.

4. A process for the production of hydrogenated cyclopentadiene polymer which comprises hydrogenating a benzene-soluble catalytic homopolymer of cyclopentadiene having 1,4 linkages with gaseous hydrogen in contact with from about 0.01 to 1% palladium by weight of the catalytic polymer of cyclopentadiene in a solvent selected from the group consisting of aromatic, cycloalkane and halogenated alkane compounds, at a temperature between about 25° C. and 120° C. and at a pressure above atmospheric until a minimum of 60% of the unsaturation of the initial polycyclopentadiene reactant has been hydrogenated.

5. A process for the production of hydrogenated cyclopentadiene polymer which comprises hydrogenating a benzene-soluble catalytic homopolymer of cyclopentadiene having 1,4 linkages with gaseous hydrogen in the presence of from about 0.01 to about 1% palladium by weight of the catalytic polymer of cyclopentadiene and in a solvent selected from the group consisting of aromatic, cycloalkene, and halogenated alkane compounds, at a temperature between about 25° C. and 120° C. and at a pressure above about 100 pounds per square inch until a minimum of 80% of the unsaturation of the initial polycyclopentadiene reactant has been hydrogenated.

6. An improvement in the process for the production of hydrogenated cyclopentadiene polymer by the reaction of gaseous hydrogen and a benzene-soluble catalytic homopolymer of cyclopentadiene having 1,4 linkages which comprises performing the reaction in the presence of from about 0.01 to about 1% palladium by weight of the polymer of cyclopentadiene in a solvent selected from the group consisting of aromatic, cycloalkane and halogenated alkane compounds, at a temperature between about 60° C. and 120° C. and at a pressure between about 100 and 150 pounds per square inch until a minimum of 60% of the unsaturation of the initial polycyclopentadiene reactant has been hydrogenated.

7. A process for the production of hydrogenated cyclopentadiene polymer by the reaction of gaseous hydrogen and a benzene-soluble catalytic homopolymer of cyclopentadiene having 1,4 linkages which comprises performing the reaction in the presence of from about 0.01 to about 1% palladium by weight of the polymer of cyclopentadiene in xylene solvent at a temperature between about 60° C. and 120° C. and at a pressure between about 100 and 150 per square inch until a minimum of 60% of the unsaturation of the initial polycyclopentadiene reactant has been hydrogenated.

References Cited in the file of this patent

UNITED STATES PATENTS

| | | |
|---|---|---|
| 2,319,271 | Soday | May 18, 1943 |
| 2,394,816 | Soday | Feb. 12, 1946 |

OTHER REFERENCES

Bruson et al.: Ind. Eng. Chem., vol. 18, pages 381–3, 1926.

Adler et al.: Chemical Abstracts, vol. 26, pages 5093–4, 1932.

Freidlin et al.: Chemical Abstracts, vol. 51, page 11259, 1957.

UNITED STATES PATENT OFFICE
CERTIFICATE OF CORRECTION

Patent No. 3,062,800                                      November 6, 1962

Israel J. Dissen

It is hereby certified that error appears in the above numbered patent requiring correction and that the said Letters Patent should read as corrected below.

Column 2, line 5, for "cyclophentadiene" read -- cyclopentadiene --; column 3, line 25, for "1½" read -- 1½% --; column 3, line 34, after "baking" insert a comma; column 6, line 53, after "pack" insert -- can --; column 7, line 18, after "fabricated" insert -- shortly --; column 8, line 28, for "cycloalkene" read -- cycloalkane --; line 54, after "150" insert -- pounds --.

Signed and sealed this 4th day of June 1963.

(SEAL)
Attest:

ERNEST W. SWIDER
Attesting Officer

DAVID L. LADD
Commissioner of Patents